United States Patent
Lai

(10) Patent No.: US 7,682,075 B2
(45) Date of Patent: Mar. 23, 2010

(54) APPARATUS AND METHOD FOR TEMPERATURE MEASUREMENT

(75) Inventor: Joseph Ki Leuk Lai, Hong Kong (CN)

(73) Assignee: Meyer Aluminum Limited, Hong Kong (CN)

( * ) Notice: Subject to any disclaimer, the term of this patent is extended or adjusted under 35 U.S.C. 154(b) by 28 days.

(21) Appl. No.: 11/585,525

(22) Filed: Oct. 24, 2006

(65) Prior Publication Data
US 2007/0217480 A1   Sep. 20, 2007

(30) Foreign Application Priority Data
Mar. 14, 2006   (CN) .................... 2006 1 0064850

(51) Int. Cl.
*G01K 7/00* (2006.01)
*G01K 1/00* (2006.01)
*H01L 35/02* (2006.01)

(52) U.S. Cl. ................ 374/179; 374/208; 136/230; 136/221

(58) Field of Classification Search ........... 374/179, 374/208; 136/221, 230
See application file for complete search history.

(56) References Cited

U.S. PATENT DOCUMENTS

| | | | | |
|---|---|---|---|---|
| 2,703,495 A | * | 3/1955 | Benninghoff | 374/155 |
| 2,839,594 A | * | 6/1958 | Schneidersmann | 136/221 |
| 3,476,910 A | * | 11/1969 | Vallante et al. | 219/155 |
| 3,573,995 A | * | 4/1971 | Senbokuya | 136/221 |
| 4,242,148 A | * | 12/1980 | Remmert | 136/221 |
| 4,259,123 A | * | 3/1981 | Tymkewicz | 136/221 |
| 4,265,117 A | * | 5/1981 | Thoma et al. | 136/221 |
| 4,279,154 A | * | 7/1981 | Nakamura | 136/221 |
| 4,419,023 A | * | 12/1983 | Hager, Jr. | 374/179 |
| 4,889,483 A | * | 12/1989 | Gentry | 432/49 |
| 4,907,894 A | * | 3/1990 | Guyoncourt | 374/120 |
| 5,123,752 A | * | 6/1992 | Paz-Pujalt et al. | 374/153 |
| 5,411,600 A | * | 5/1995 | Rimai et al. | 136/225 |
| 5,618,109 A | * | 4/1997 | Culbertson | 374/179 |
| 6,113,263 A | * | 9/2000 | Satoh | 374/179 |
| 6,193,414 B1 | * | 2/2001 | Balzano | 374/208 |
| 2007/0250275 A1 | * | 10/2007 | Ohashi et al. | 702/33 |

FOREIGN PATENT DOCUMENTS

EP   289793 A2 * 11/1988

OTHER PUBLICATIONS

Complete Temperature Measurement Handbook and Encyclopedia, Omega Engineering, Inc., pp. A-30-A-31, 1986.*
http://www.sheffield-pottery.com/CERABLANKET-KAOWOOL-BLANKET-p/tccb.htm; "Kaowood Cerablanket".*
http://www.sheffield-pottery.com/SUPERWOOL-607-HT-BLANKET-8-lb-1-p/tcsw607ht.htm; "Superwool 607HT Blanket".*

* cited by examiner

*Primary Examiner*—Gail Verbitsky
*Assistant Examiner*—Mirellys Jagan
(74) *Attorney, Agent, or Firm*—Heslin Rothenberg Farley & Mesiti P.C.

(57) ABSTRACT

A temperature sensor for measuring a temperature of a moving or stationary surface includes a main body portion and a probe head with thermocouple element, the probe head coupled to the main body portion such that the probe head reciprocates relative to the main body portion in a pulsed manner.

13 Claims, 3 Drawing Sheets

APPARATUS AND METHOD FOR TEMPERATURE MEASUREMENT

CROSS-REFERENCE TO RELATED APPLICATIONS

This application claims priority from Chinese Patent Application No. 200610064850.3 filed Mar. 14, 2003, which is hereby incorporated herein by reference in its entirety.

FIELD OF THE INVENTION

This invention relates to an apparatus and method for the measurement of temperature, and in particular though not exclusively to the measurement of the temperature of a moving surface, for example, the surface temperature of a metal during a rolling process and/or the surface temperature of rollers during such a process.

BACKGROUND OF THE INVENTION

The accurate measurement of temperature is an important aspect of a metal rolling process. The surface temperature of the metal as it is being rolled, and the surface temperature of the rollers, are important parameters in the rolling process. For some metals in particular, such as aluminum, maintaining the surface temperature within a well-defined range is a very important requirement if high quality aluminum is to be produced. If the desired temperature control is not met, the quality of the resulting aluminum will be lower.

Controlling the temperature assumes however that the temperature can be reliably measured, and in the context of an aluminum rolling process this is difficult to achieve. The ambient conditions, including a very damp atmosphere owing to the presence of large amounts of lubricating fluid, provide an environment in which the accurate and reliable measurement of temperature is difficult to achieve.

A number of known techniques have been used in an attempt to measure surface temperatures in processes such as metal rolling with varying degrees of success.

Infrared pyrometry techniques are well-known and popular methods for measuring surface temperature and have the advantage of being non-contact. They do however have a number of disadvantages, especially in the context of measuring the surface temperature of a metal such as aluminum during a rolling process. Firstly, for example, pyrometric techniques depend on the emissivity of the surface. This is a particular problem for measuring the surface temperature of a metal such as aluminum which is reflective and has a low emissivity. Pyrometry can also be disturbed by the presence of particles in the light path, such as dirt, dust and water vapor. These problems can be particularly severe in an aluminum rolling mill. Attempts to solve this problem include the use of multi-wavelength radiation detectors with an air stream to minimize clogging of the lens system by dust particles, and by using a fiber optic cable to bring the optical system closer to the surface. However, when the target surface is covered with lubricants, even multi-wavelength radiation detectors cannot measure the true surface temperature because they measure the temperature of the lubricants rather than the metal surface. Blowing the surface with an airstream to clear the lubricants will artificially cool the surface. Furthermore these solutions increase further the cost of what is already an expensive measurement technique.

A further disadvantage to pyrometric techniques is that the measurement error increases with increasing wavelength of the radiation used for the measurement. Ideally therefore the shortest possible wavelength should be chosen. However, at comparatively low temperatures (e.g., below about 300° C.) the intensity of the radiation becomes very low or even close to zero at short wavelengths. Thus pyrometry is a technique best suited to relatively high temperatures, but in an aluminum rolling process it is often necessary to control temperatures that are below 300° C.

While pyrometry has the advantage of being a non-contact measurement technique, small gap measurement techniques using thermocouples have also been used. These methods involve the use of a thermocouple positioned in very close proximity to the surface. Commercial instruments, such as, the CO 15 series thermocouple provided by CHINO of Tokyo, Japan, are available and such instruments are designed for the measurement of the surface temperature of moving objects such as rollers and moving sheets. The thermocouple has a built-in automatic correction circuit for the difference between the surrounding air and actual temperature of an object. No emissivity compensation to the object surface is necessary. The measurement ranges from 1 mm to 6 mm depending on the model.

However, temperature measurement using the small gap method depends critically on maintaining a constant air gap between the sensor and the surface. Thermal expansion, eccentricities of the rollers and other variables often affect the width of the gap and culminate in significant errors. Moreover, the result is also seriously affected by the presence of lubricant film, water vapor and turbulent air, all of which may be common in aluminum rolling mills.

Also known in the art are numerous methods that require a temperature measuring probe to contact the surface the temperature of which is to be measured. The most common type consists of a thermocouple strip with the hot junction located at the middle of the strip. The strip is designed to be pressed onto the target surface for thermal contact. Pressure on the strip is limited by a polytetraflouroethylene (PTFE) (for example, DuPont's TEFLON® brand polytetraflouroethylene) or stainless steel rollers or guides attached to the measuring head of the probe. Another known method, for example, includes a spring loaded thermocouple tip welded onto a copper disc for thermal contact.

Commercially available contact surface probes usually have measurement errors of 5 to 20° C. depending on factors such as local surface flatness and the extent of matching between the thermal contact surfaces. Contact measurement on stationary surfaces always give errors that are lower than the true value because of the temperature drop across the contact interface. The error limits become wider on moving surfaces due to factors such as frictional heat and variations in surface contact conditions etc.

Another disadvantage of such prior art devices is that commercial surface contact probes tend to produce a mark or groove on soft metal surfaces such as aluminum. Dirt and other particles may also accumulate at the contact probe resulting in unsightly marks on the metal surface. On rollers these probes also tend to disturb the loosely adhered aluminum oxide on the surface, which could have undesirable effects on the appearance of the sheet product.

SUMMARY OF THE INVENTION

According to the present invention there is provided a temperature sensor comprising a main body portion and a probe head, wherein the probe head is provided with a thermocouple element for measuring the temperature of a surface contacted by the probe head, and means for generating reciprocal movement of the probe head relative to the main body portion. The probe further comprises a conformable sheet material adapted to contact the surface and an elastomeric material, wherein the thermocouple element is positioned between the conformable sheet material and the elastomeric material, and a sheet of heat conducting material located between the thermocouple and the elastomeric material The probe further comprises means for generating pulsed reciprocal movement of the probe head relative to the main body portion.

In a preferred embodiment the probe head is mounted on one end of a shaft member that is adapted to reciprocate relative to the main body portion of the temperature sensor. The shaft may be caused to reciprocate (preferably at a frequency of no more than 25 Hz) by a solenoid surrounding the shaft and to which an AC current may be supplied. Compression spring means may be provided between the probe head and the main body portion.

The main body is preferably provided with mounting means by which the sensor may be mounted near a surface the temperature of which is to be measured.

According to another aspect of the invention there is provided a temperature sensor comprising a main body portion and a probe head, wherein the probe head is provided with a thermocouple element for measuring the temperature of a surface contacted by the probe head in a pulsed reciprocal manner, said thermocouple being positioned between a sheet of conformable material and an elastomeric material. The probe head further comprises a sheet of heat conducting material located between the thermocouple and the elastomeric material.

According to a still further aspect of the invention there is provided a method for measuring the temperature of a moving surface. The method comprises, placing a temperature measuring probe head in proximity to the surface, the temperature measuring probe head including a thermocouple, and causing the probe head to reciprocate towards and away from the surface such that the temperature measuring probe head contacts the surface in a pulsed manner. The method further comprises measuring the temperature of the surface while the probe head contacts the surface in the pulsed manner.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Figure 1:
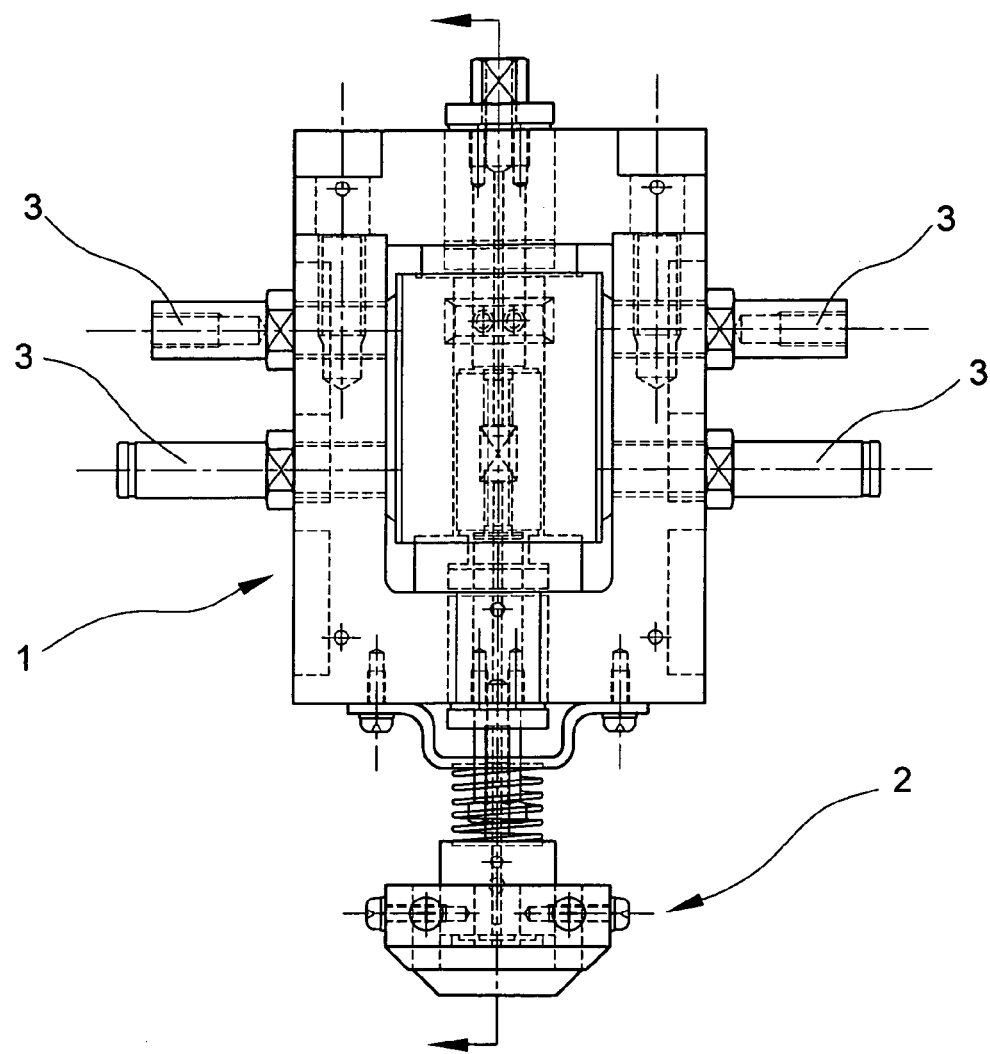
FIG. 1 is a side view of a temperature probe according to an embodiment of the invention.

Referring firstly to FIG. 1 there is shown a side view of a temperature sensor according to an embodiment of the invention. The sensor comprises a main body portion 1 and a contact probe head 2. The contact probe head 2 is adapted to contact a surface the temperature of which is to be measured and is adapted to move relative to the main body portion 1 as will be described further below. Formed on either side of the main body portion 1 are a plurality of mounting means 3 that are provided to enable the temperature sensor to be mounted in a position fixed relative to a surface the temperature of which is to be measured.

Figure 2:
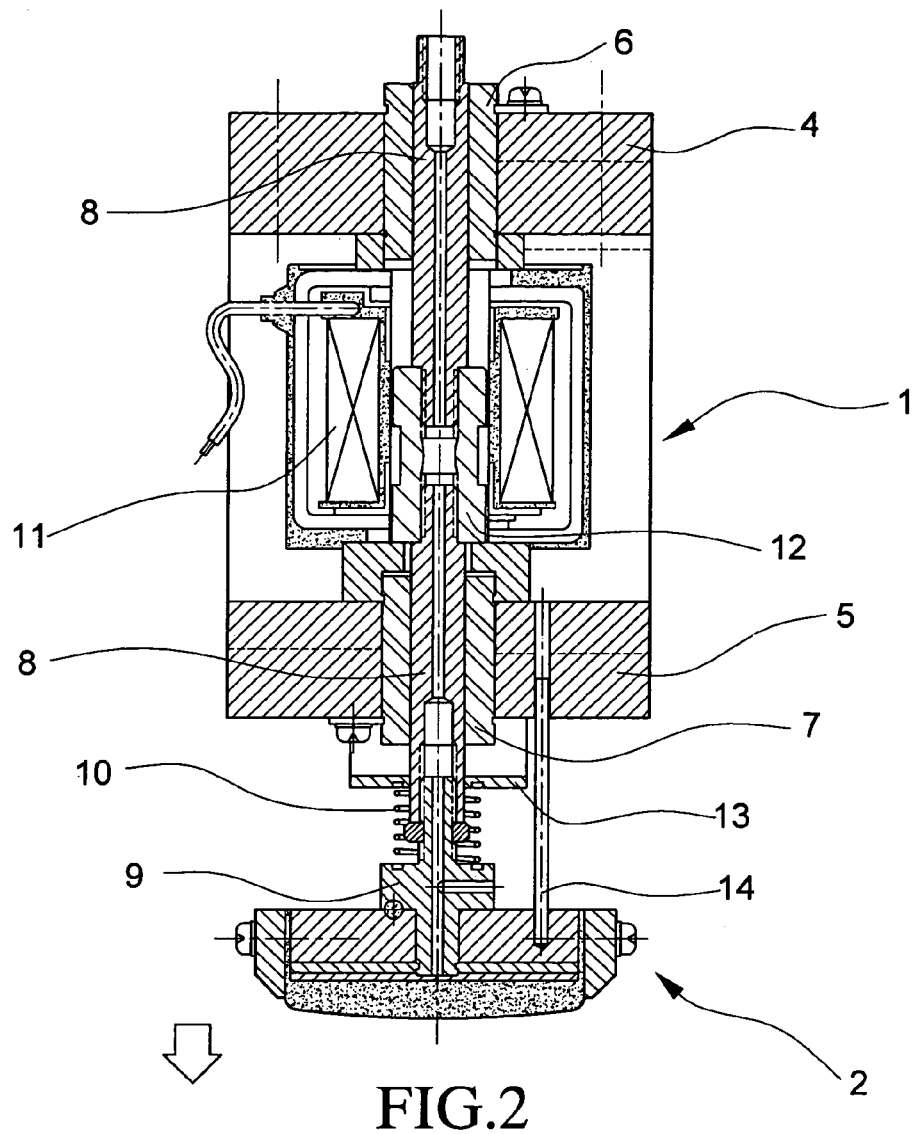
FIG. 2 is a sectional view of the probe of FIG. 1 taken along the line A-A in FIG. 1.

FIG. 2 shows a sectional view through the temperature sensor of FIG. 1 along the line A-A of FIG. 1. From FIG. 2 it can be seen that the main body portion 1 includes upper and lower aluminum plates 4,5. In the center of each aluminum plate 4,5 is provided a respective linear bearing 6,7 that support a shaft 8 in such that the shaft 8 can move in a reciprocating manner in the direction of arrow 24 in FIG. 2. Fitted to the lower end of the shaft 8 is an adaptor member 9 that connects to the probe head 2. A compression spring 10 is provided between the adaptor member 9 and a small metal plate 13 fixed to the lower surface of the lower aluminum plate 5. Guide pin 14 extends between the probe head 2 and the lower aluminum plate 5 where it is slidably received in a bore. Guide pin 14 serves to ensure the reciprocal movement of the probe head 2 does not include any unwanted lateral or rotational components.

Between the plates 4,5 the space that they define is occupied by a solenoid 11 that surrounds the shaft 8. An armature assembly 12 is fixed to the linear shaft 8 in the region of the shaft 8 that is surrounded by the solenoid 11. Solenoid 11 is electrically coupled to an AC supply (not shown) and it will be understood that by means of the application of an alternating AC supply to the solenoid 11 the armature 12 and thus the shaft 8 are caused to reciprocate along the axis of the shaft 8, and the contact probe head 2 moves up and down correspondingly with the suddenness of its movements being mitigated by the compression spring 10. The frequency of pulsation of the contact probe head 2 can be controlled by varying the frequency of the AC supply to the solenoid 11. The frequency may be controlled depending on the requirements of a desired application, but a maximum frequency of 25 Hz is preferred. It will of course also be understood that other means for causing the contact probe head 2 to reciprocate may be designed. A pneumatic or hydraulic system for example could be used to create the desired reciprocal movement.

The contact time (i.e., when the probe head 2 is in contact with the surface to be measured) and the detached time (i.e., when the probe head 2 is not in contact with the surface) can be individually adjusted for particular applications. Increased contact time will provide increase accuracy in the temperature measurement, but with increased contact time there is a greater risk of damage to the surface. In one example, the contact time is 0.1 s and the detached time is 0.5 s to provide accurate measurements with minimum surface damage. The optimum values may be established through routine experimentation for different applications.

Figure 3:
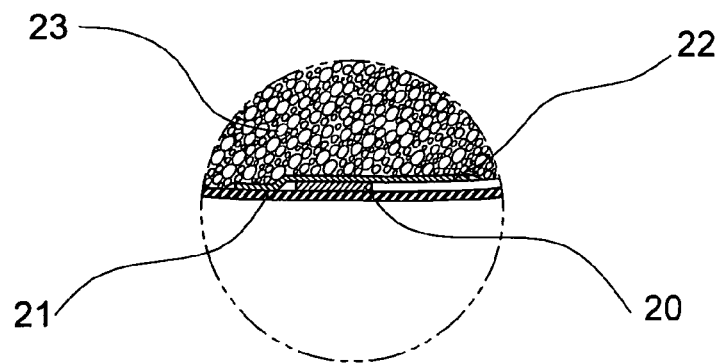
FIG. 3 is a detailed view of the structure of the contact surface of the temperature probe of FIG. 1.
Figure 4:
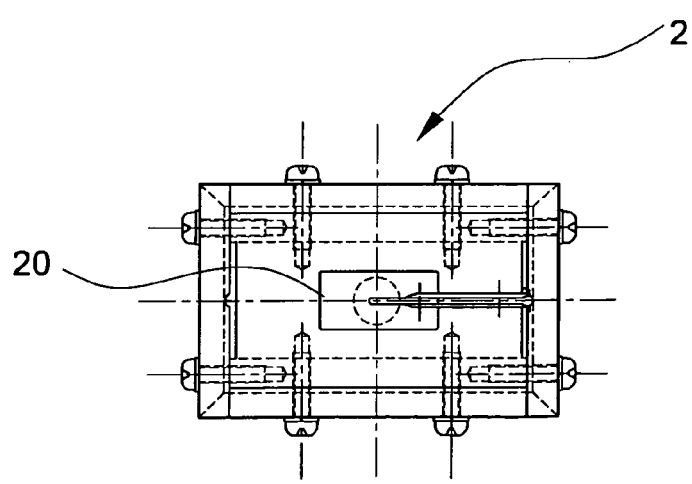
FIG. 4 is a view of the probe head from below.

FIG. 3 shows the contact probe head 2 in more detail, while FIG. 4 is a view from beneath the probe head showing in particular the location of a thermocouple 20. The thermocouple 20 is the main temperature sensing element of the contact probe head 2 and may be of a known type made from very thin (e.g., 0.013 mm) foil and 0.25 mm diameter thermocouple wire. An example of a suitable thermocouple is the type sold under the brand name CEMENT-ON by Omega Engineering, Inc., Stamford, Conn. A thermocouple of this type has the advantage of having very low thermal inertia. The thermocouple 20 is sandwiched between a layer of conformable tape 21 and a layer of aluminum foil 22. The tape 21 is preferably made of any suitable heat resistant material with a low surface friction, high chemical and abrasion resistance, and is chosen to conform closely to the surface to be measured. One example of suitable tape is polytetraflouroethylene (PTFE) tape (for example, TEFLON® tape provided by DuPont) with a thickness of 0.003," but other materials may be possible such as polyamide films or even aluminum foil. PTFE is effective up to about 315° C., but for higher temperatures polyamide film may be preferred as it can be used up to 370° C. For still higher temperatures, aluminum film can be used as its excellent thermal conductivity improves the response time. However, aluminum foil is not as durable as PTFE or polyamide and may cause some damage on soft target surfaces.

On the side of the thermocouple 20 opposite from the tape 21 is provided a thin (e.g., 0.017 mm) sheet of aluminum foil 22 which collects heat from the tape and conducts it to the thermocouple hot junction, and then to a body 23 of an elastomeric material, for example, high performance silicone foam rubber chosen to provide excellent fire, chemical and moisture resistance, as well as excellent temperature tolerance. An alternative to an elastomeric material is a high temperature insulation wool, which has good heat resistance. This is less preferred, however, as it has lower elasticity and tends to absorb moisture.

Figure 5:
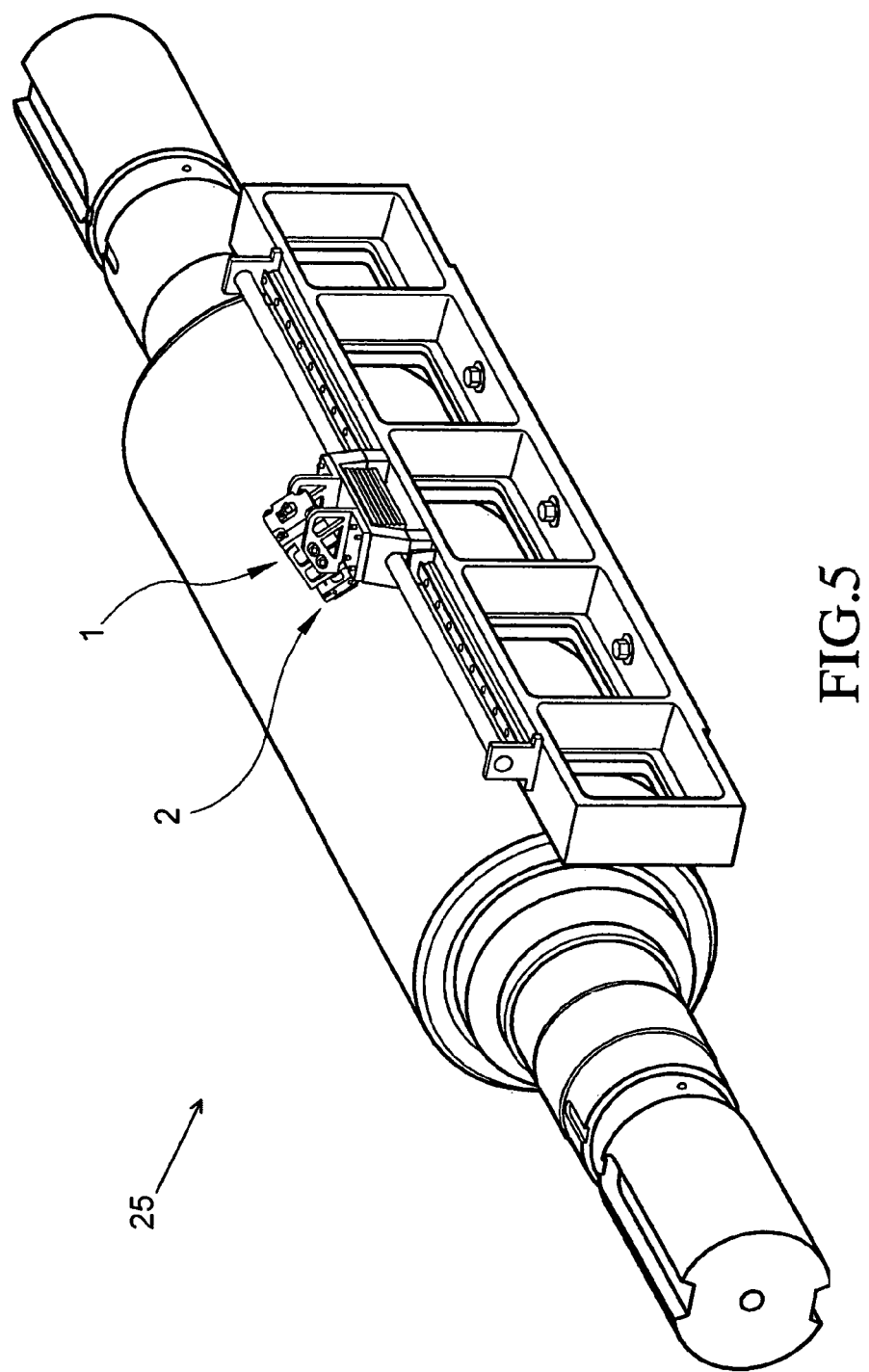
FIG. 5 is a perspective view showing the temperature probe according to the embodiment of FIGS. 1 to 4 in a practical application.

FIG. 5 shows an example of how a temperature sensor according to an embodiment of the invention may be used in a practical application. In this example, the sensor is used to measure the surface temperature of a work roll 25 in a metal rolling operation. As can be seen from FIG. 5, the sensor is mounted so that the probe head 2 is close to the surface of the work roll but not normally in contact therewith until the probe head 2 is caused to reciprocate by the application of an alternating current to the solenoid. When an AC current is applied to the solenoid, the probe head 2 is caused to reciprocate into and out of contact with the surface of the work roll. Although the probe head is only in contact with the surface of the work roll for a fraction of a second, the response time of the thermocouple 20 is fast enough (about 10-20 ms) that the thermocouple can respond to the temperature of the work roll and produce an output signal. Furthermore, the use of the conformable tape 21 ensures a good contact between the probe head 2 and the surface of the work roll. This has the advantage of facilitating reliable temperature readings.

Because the probe head 2 is only in intermittent contact with the surface of which the temperature is to be measured, scratching of that surface can be avoided, as well as the accumulation of dirt around the probe head 2.

The present invention, at least in its preferred forms, provides a temperature sensor that is able to measure surface temperatures to an accuracy of between about ±4° C., which is a significant improvement over the prior art and sufficient for many practical applications. Furthermore, because the contact with the surface is pulsed, intermittent damage to a moving surface is substantially reduced. In addition, although the present invention is particularly suitable to the measurement of the temperature of moving surfaces, it will be understood that it is not limited thereto and could also be used to measure the temperature of stationary surfaces.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A temperature sensor, comprising:
   a main body portion;
   a probe head, the probe head comprising a thermocouple element for measuring a temperature of a surface when contacted by the probe head, a conformable sheet material adapted to contact the surface and an elastomeric material, wherein the thermocouple element is positioned between the conformable sheet material and the elastomeric material, and a sheet of heat conducting material located between the thermocouple and the elastomeric material; and
   means for generating pulsed reciprocal movement of the probe head relative to the main body portion.

2. The temperature sensor of claim 1, wherein said means for generating reciprocal movement comprises compression spring means coupled between said probe head and said main body portion.

3. The temperature sensor of claim 1, further comprising means for mounting said temperature sensor near a surface the temperature of which is to be measured.

4. The temperature sensor of claim 1, wherein said means for generating reciprocal movement comprises means for generating reciprocal movement of the probe head relative to the main body portion at a frequency of no more than 25 Hz.

5. The temperature sensor of claim 1, wherein the conformable sheet material comprises one of PTFE tape, a polyamide film, and aluminum foil.

6. The temperature sensor of claim 1, wherein the elastomeric material comprises one of silicone foam rubber and insulation wool.

7. The temperature sensor of claim 1, wherein the heat conducting material is adapted to conduct heat to a hot junction of the thermocouple.

8. The temperature sensor of claim 1, wherein said probe head is mounted on one end of a shaft member that is adapted to reciprocate relative to the main body portion of said temperature sensor.

9. The temperature sensor of claim 8, further comprising a solenoid surrounding said shaft for causing reciprocation of said shaft when an AC current is supplied to the solenoid.

10. A temperature sensor, comprising:
    a main body portion; and
    a probe head coupled to the main body portion, the probe head comprising a thermocouple element for measuring a temperature of a surface when contacted by the probe head in a pulsed reciprocal manner, wherein the thermocouple element is positioned between a sheet of conformable material adapted to contact the surface and an elastomeric material, and wherein the probe head further comprises a sheet of heat conducting material located between the thermocouple and the elastomeric material.

11. The temperature sensor of claim 10, wherein the sheet of conformable material comprises one of PTFE tape, a polyamide film, and aluminum foil.

12. The temperature sensor of claim 10, wherein the elastomeric material comprises one of silicone foam rubber and insulation wool.

13. The temperature sensor of claim 10, wherein the heat conducting material is adapted to conduct heat to a hot junction of the thermocouple.

* * * * *